United States Patent
Chen et al.

(10) Patent No.: US 6,930,247 B2
(45) Date of Patent: Aug. 16, 2005

(54) CAGE MOUNTING ASSEMBLY

(75) Inventors: Yun Lung Chen, Tu-chen (TW); Hui Li, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/946,739

(22) Filed: Sep. 21, 2004

(65) Prior Publication Data

US 2005/0133237 A1   Jun. 23, 2005

(30) Foreign Application Priority Data

Dec. 20, 2003  (CN) .............................. 20125261 U

(51) Int. Cl.[7] .............................................. H02G 3/08
(52) U.S. Cl. ........................... 174/50; 174/60; 174/64; 361/683; 312/223.1
(58) Field of Search ............................. 174/50, 60, 64, 174/17 R, 135, 58; 361/683, 686, 724; 312/223.1, 312/265.6; 220/4.31

(56) References Cited

U.S. PATENT DOCUMENTS

| | | | |
|---|---|---|---|
| 6,104,613 A * | 8/2000 | Urda et al. ................. | 361/704 |
| 6,621,692 B1 * | 9/2003 | Johnson et al. ............. | 361/683 |
| 6,737,577 B1 * | 5/2004 | Liao et al. .................... | 174/50 |
| 6,768,055 B1 * | 7/2004 | Gorin .......................... | 174/50 |
| 6,791,027 B1 * | 9/2004 | Nicolai et al. ................ | 174/50 |
| 6,809,258 B1 * | 10/2004 | Dang et al. ................... | 174/50 |

FOREIGN PATENT DOCUMENTS

| TW | 371062 | 9/1999 |
|---|---|---|
| TW | 492614 | 6/2002 |

* cited by examiner

Primary Examiner—Dhiru R. Patel
(74) Attorney, Agent, or Firm—Wei Te Chung

(57) ABSTRACT

A cage mounting assembly includes a chassis (10), a supporting base (20) and a cage (40). The chassis includes a bottom wall (12), the bottom wall engages with the base. The base extends an arm portion (24), the arm portion forms a pair of pillars (34), each with a spring (38). The cage forms a pair of restraining tabs (54) thereunder corresponding to the pair of pillars of the base. Each tab defines a through hole (56). The cage is moved into the chassis, the pair of pillars of the base are respectively received in the through holes of the barbs. As the cage is continuously moved, the springs on the pillars are compressed, then the cage is fixed to the chassis. When the cage is disengaged from the chassis, the cage is pushed out from the chassis by the compressed springs.

24 Claims, 5 Drawing Sheets

CAGE MOUNTING ASSEMBLY

BACKGROUND OF THE INVENTION

1. Field of the Invention

The present invention relates to a cage mounting assembly, and more particularly to a cage mounting assembly with a simplified configuration and capable of prompt for detaching direction for convenient use.

2. Description of Related Art

Various data storage devices are installed in electronic apparatus especially in a computer for communication and handling of data. Such devices include, for example, hard disk drives, floppy disk drives and CD-ROM (Compact Disk-Read Only Memory) drives. Usually corresponding cages are used to mount these data storage devices in a computer chassis. A typical cage mounting assembly is directly mounted to the computer chassis with a plurality of screws. However, a screwdriver or other detaching toolings are necessary for installation or removal of the screws, which causes inconvenience and time-consuming issues in cage assembly or disassembly process.

A typical pivot attaching cage mounting assembly is disclosed in Taiwan patent No. 492614. The cage mounting assembly comprises a chassis and two cages. The chassis includes a mounting panel, and the panel extends at least one locating tab. The two cages are pivotally attached to the mounting panel on two sides thereof. Each of the two cages integrally extends a supporting leg at one side thereof, and forms a flange at the other side thereof. The flanges of the two cages are rotatablely connected with the locating tab by connecting shafts. The supporting legs function as supports when any of the cages is rotated to a position paralleling to the other one. Each of the cages can be pivoted to a folding position upon the other one in case of cage maintenance or assembly. However, in the conventional cage mounting assembly disclosed above, the cages are pivotally connected with the chassis and cannot be conveniently detached from the chassis without using a screwdriver or other detaching toolings, which causes time-consuming issue in cage assembly or disassembly process. In addition, the conventional cage mounting assembly cannot be automatically sprung out from the chassis in a direction perpendicular to a front panel of the chassis for convenience of users.

Another typical cage mounting assembly is disclosed in Taiwan Patent No. 371062. The cage mounting assembly comprises a cage and a fixing bracket. The fixing bracket forms a pair of first slideways and defines a pair of screw apertures. A top face of the cage forms a pair of second guide ways paralleling with each other corresponding to the first slideways of the bracket and a pair of fixing pieces perpendicularly extending from the top face of the cage. Each fixing piece defines a fixing hole. In assembly, the second slideways of the cage slide along the first slideways of the bracket. A pair of bolts respectively penetrate through the corresponding fixing holes of the cage and received in the screw apertures of the bracket, thereby mounting the cage to the bracket. However, a suspension attaching means adopted in the conventional cage mounting assembly disclosed therebefoe often causes vibration issue and can hardly provide a firm fixation. In addition, the cage of the conventional cage mounting assembly is attached to the bracket by screws. A screwdriver or other detaching toolings for assembly or disassembly of the screws is necessary, which is unduly inconvenient and laborious. Furthermore, the directly attaching means of the conventional cage mounting assembly can hardly prompt for the detaching direction of the cage.

SUMMARY OF THE INVENTION

Accordingly, an object of the present invention is to provide a cage mounting assembly with a simplified configuration and capable of prompt for detaching direction for convenient use.

To achieve the above object, a cage mounting assembly includes a chassis, a supporting base and a cage. The chassis includes a bottom wall, a front wall and two side walls, the front wall defining an opening and a mounting aperture near the opening. The supporting base is mounted on the bottom wall of the chassis, the base includes a bottom portion, an arm portion extending from one side of the bottom portion and an operating member formed from another side of the bottom portion. The arm portion forms a pair of pillars covered with a spring, and the operating member includes a hook and a handle extending from the hook. The cage includes a first and a second receiving plates. The first receiving plate forms a pair of restraining tabs thereunder corresponding to the pair of pillars of the base, each tab defines a through hole. The second receiving plate forms a barb thereunder engaging with the hook of the base. The cage is moved into the chassis through the opening, and the pair of pillars of the base are respectively received in the through holes of the barbs. As the cage is continuously moved, the springs on the pillars are compressed and the barb of the cage engages with the hook of the base, thereby mounting the cage to the chassis. The handle is pressed down to disengage the hook from the barb and the cage is pushed out from the chassis by the compressed springs.

Other objects, advantages and novel features of the present invention will be drawn from the following detailed description of preferred embodiment of the present invention with the attached drawings, in which:

DETAILED DESCRIPTION OF THE INVENTION

Figure 1:
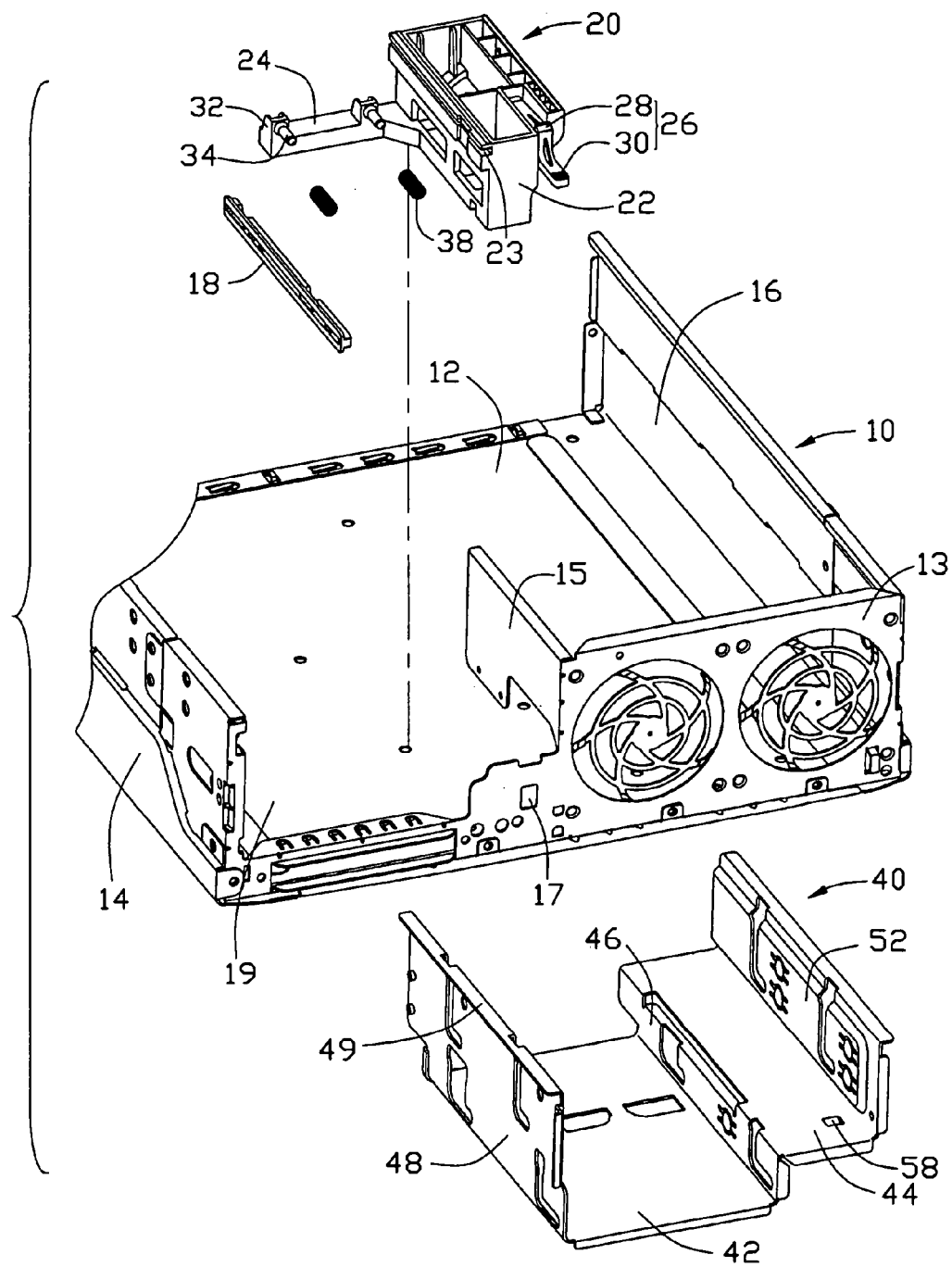
FIG. 1 is an exploded, isometric view of a cage mounting assembly in accordance with a preferred embodiment of the present invention comprising a chassis, a cage and a supporting base.

Referring to FIG. 1, a cage mounting assembly in accordance with the preferred embodiment of the present invention comprises a chassis 10, a supporting base 20 engaged in the chassis 10 and a cage 40 mounted to the chassis 10 on the supporting base 20. Usually data storage devices are received in the cage 40 for communication and handling of data. Such devices include, for example, hard disk drives, floppy disk drives or CD-ROMs, etc. In this embodiment, hard disk drives (not shown) are preferred.

The chassis 10 has a bottom wall 12. The bottom wall 12 perpendicularly extends two side walls 14,16 from two opposite edges (not labeled), and further perpendicularly extends a front wall 13. The front wall 13 defines an irregular opening 19 at a side portion and a rectangular mounting aperture 17 near the opening 19. The front wall 13 inwardly extends a supplement wall 15 from the middle thereof. One of the side walls 14,16 close to the irregular opening 19 supports a rod-like sliding rail 18.

Figure 2:
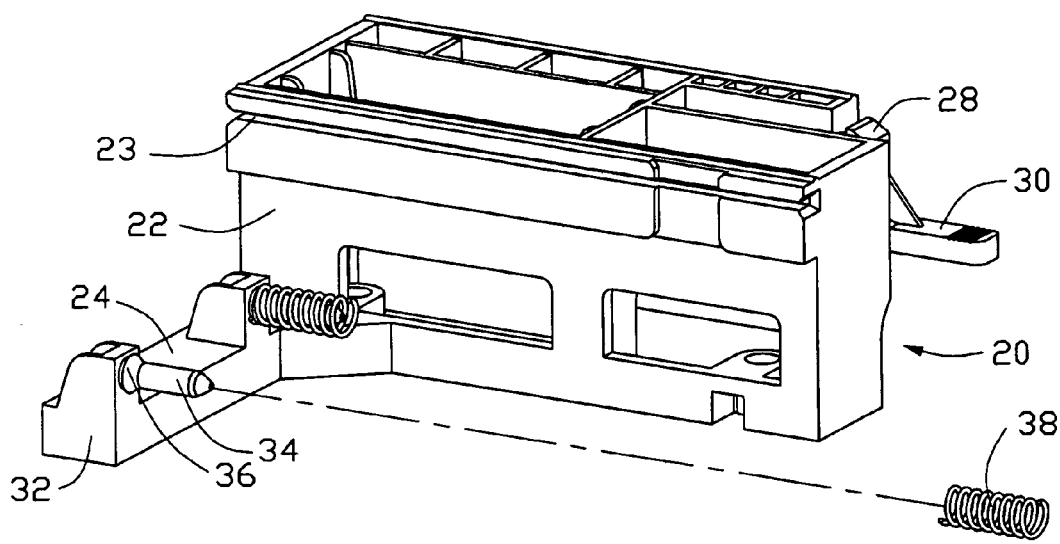
FIG. 2 is an enlarged view of the supporting base of the cage mounting assembly of FIG. 1.

Also referring to FIG. 2, The supporting base 20 comprises a bottom portion 22 fixed to the bottom wall 12 of the chassis 10 by bolt (not shown). The bottom portion 22 is planar at the top to cooperate with the sliding rail 18 on the side wall 14 to support the cage 40. The bottom portion 22 defines a guiding slot 23 paralleling to the bottom wall 12 of the chassis 10 and extends an arm portion 24 perpendicular to the bottom portion 22. The bottom portion 22 forms a operating member 26 from a opposite side thereof.

The operating member 26 extending from the bottom portion 22 is long and upwardly forms a hook 28 at a root thereof, and a handle 30 is formed from the hook 28 at a distal end of the operating member 26 for penetrating the mounting aperture 17 in the front wall 13 of the chassis 10. The arm portion 24 upwardly extends a pair of extrusion members 32, each extrusion member 32 vertically extending a pillar 34 therefrom. Each pillar 34 forms a blocking ring 36 at the root thereof, and is shielded by a spring 38. The springs 38 are got stuck behind the blocking ring 36 for fixation.

Figure 3:
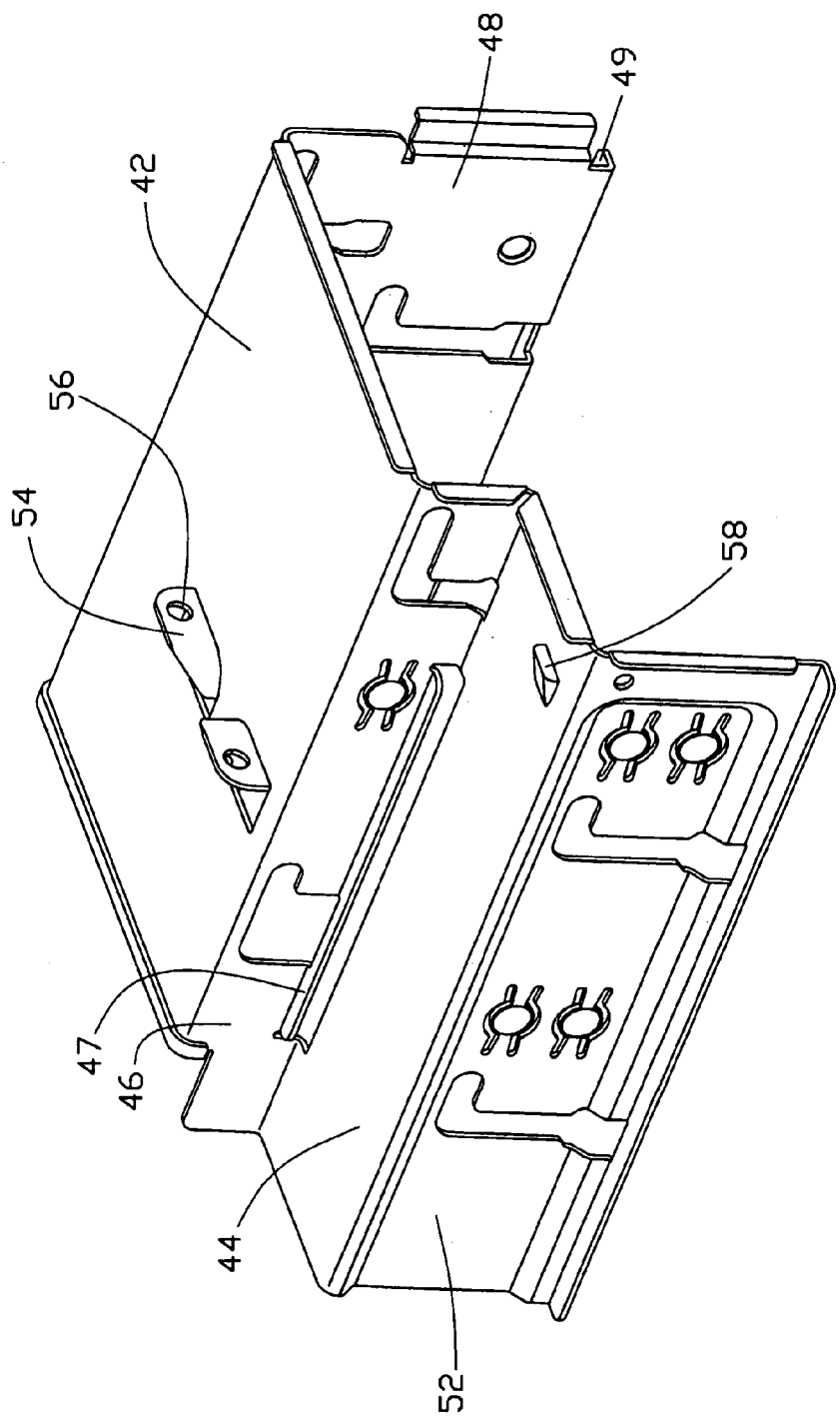
FIG. 3 is an isometric view of the cage of the cage mounting assembly, but viewed from another aspect.

Also referring to FIG. 3, the cage 40 is inserted into the chassis 10 from the irregular opening 19 and supported between the sliding rail 18 and the supporting base 20. The cage 40 comprises a first receiving plate 42 and a second receiving plate 44, substantially paralleling with each other. A connecting plate 46 joints the first and second receiving plates 42,44 together and two erect plates 48,52 are formed from the free edges of the corresponding first and second receiving plate 42,44.

The erect plate 48 extends a flange 49 substantially paralleling to the first receiving plate 42 and is capable of moving along the sliding rail 18. The connecting wall 46 extends a brim 47 received in corresponding guiding slot 23, for stably mounting the cage 40 to the chassis 10. A pair of restraining tabs 54 are formed vertically depending from the bottom the first receiving plate 42 corresponding to the pair of pillars formed on the extrusion members 24 of the arm portion 24. Each restraining tab 54 defines a through hole 56. The second receiving plate 44 forms a barb 58 corresponding to the hook 28 of the operating member 26 on the supporting base 20.

Figure 4:
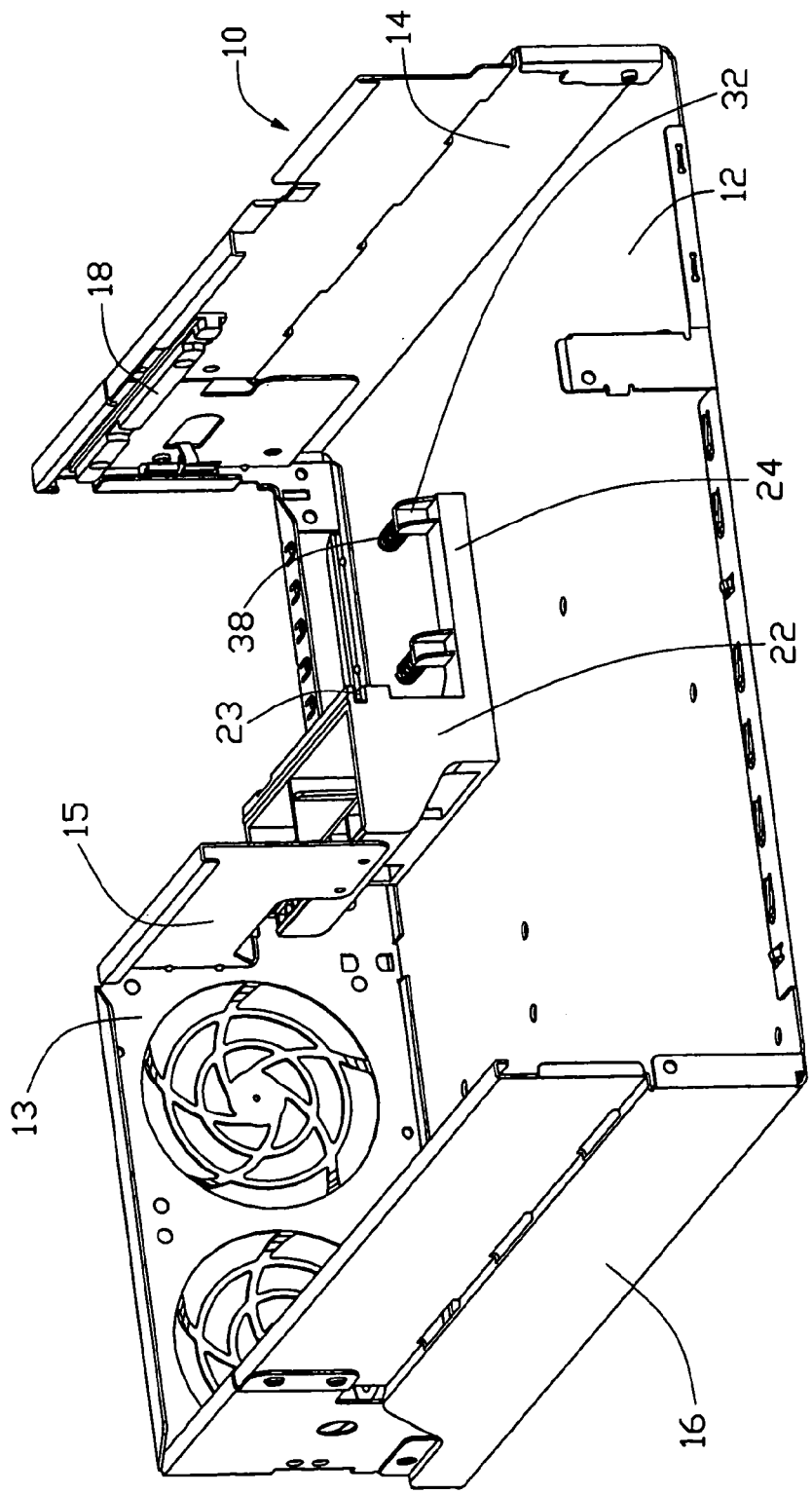
FIG. 4 is an assembled view, showing the assembled relationship between the chassis and the supporting base.
Figure 5:
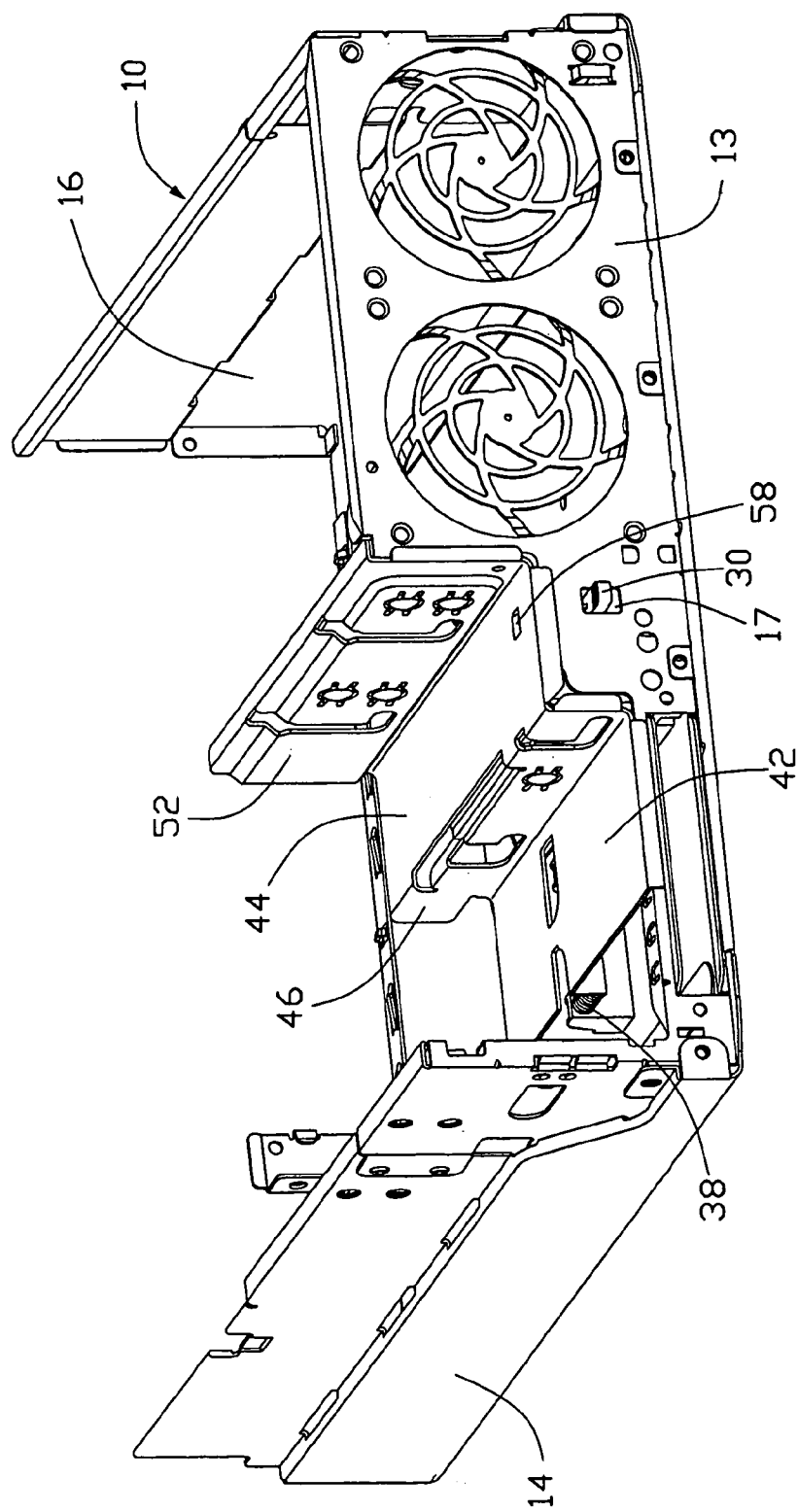
FIG. 5 is an assembled view of FIG. 1, with partly cut off for better illustration.

Referring to FIG. 4 and FIG. 5, in assembly, the supporting base 20 is mounted to the bottom wall 12 of the chassis 10 by bolts (not shown) and leaving the handle 30 getting through the mounting aperture 17 of the chassis for detaching the cage 40 from the chassis 10. The cage 40 is moved in a direction substantially perpendicular to thee front wall 13 of the chassis 10 and inserted into the chassis 10 through the irregular opening 19. When the cage 40 approaches the chassis 10, the brim 47 at the bottom of the cage 40 gets into the guiding slot 23 of the supporting base 20, the flange 49 of the erect plate 48 lies on the sliding rail 18 of the side wall 14 and the second receiving plate 44 is supported at a top of the bottom portion 22.

The cage 40 is moved forward further, the pair of pillars 34 on the arm portions 24 align with the corresponding through holes 56 in the restraining tabs 54 and penetrate through the holes 56 afterwards. The cage 40 is continuously moved to the chassis 10, the restraining tabs 54 of the cage 40 begin to press the springs 38 around the corresponding pillars 34 and the barb 58 under the second receiving plate 44 approaches the hook 28 of the supporting base 20 with the movement of the cage 40. When the cage 10 is moved into the chassis 10, the spring is compressed to a suitable extent so as to provide an elastic force on the cage 40 when the cage 40 is detached from the chassis 10, and the barb 58 under the cage 40 engages with the hook 28 of the supporting base 20, thereby mounting the cage 40 to the chassis 10. Other attaching means such as screw fastening can also be adopted to mount the cage 40 to the chassis 10.

In disassembly, the handle 30 extending out from the mounting aperture 17 of the supporting base 20 is pressed down. The handle 30 biased from the original position makes the barb 58 at the root of the operating member 26 disengage the hook 28 of the supporting base 20, thereby releasing the cage 40 from the chassis 10. Then, the compressed springs 38 on the pillars 34 begin to stretch and counter-push the released cage 40 out from the chassis 10 for prompt of detaching direction of the cage 40.

The barb 58 formed under the second plate 44 of the cage 40 alternatively can be a hole to engage with the corresponding hook 28 of the supporting base 20 for the cage 40 fixation. The receiving plate 42,44 of the cage 40 can be variable from one to even plurality corresponding to the amount of data storage devices the cage 40 received therein.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A cage mounting assembly comprising: a chassis comprising a bottom wall, a front wall and two side walls, the front wall defining an opening; a supporting base mounted on the bottom wall of the chassis, the base comprising a bottom portion, an arm portion and an operating member formed from the bottom portion, the arm portion forming at least one pillar covered with a spring, the operating member comprising an engaging hook and a handle; and a cage comprising at least two receiving plates, one of said receiving plates forming at least one restraining tab thereunder corresponding to said pillar of the base, the tab defining a through hole, and the other of said receiving plates forming an engaging barb thereunder engaging with the engaging hook of the base; wherein the cage is moved into the chassis through the opening, the at least one pillar of the base is received in a through hole of the tab, as the cage is continuously moved, the spring on the pillar is compressed and the engaging barb of the cage engages with the engaging hook of the base, thereby mounting the cage to the chassis; the handle is pressed to disengage the engaging hook and the engaging barb, and the cage is pushed out from the chassis by the compressed spring.

2. The cage mounting assembly as claimed in claim 1, wherein one of the side walls of the chassis is mounted with a sliding rail.

3. The cage mounting assembly as claimed in claim 2, wherein the cage is supported between the sliding rail and the supporting base.

4. The cage mounting assembly as claimed in claim 3, wherein a connecting plate of the cage forms a brim slidably received in a guiding slot of the supporting base.

5. The cage mounting assembly as claimed in claim 1, wherein said cage comprises a connecting plate jointing the receiving plates, and two erect plates respectively extending from the receiving plates, one of the two erect plates forms a flange supported on one of the side walls of the chassis.

6. The cage mounting assembly as claimed in claim 5, wherein the supporting base is located under an upper one of the receiving plates, the arm portion extends under a lower one of the receiving plates.

7. The cage mounting assembly as claimed in claim 1, wherein the front wall of the chassis defines a mounting aperture for the handle of the supporting base penetrating therethrough.

8. The cage mounting assembly as claimed in claim 1, wherein the bottom portion of the supporting base defines a guiding slot parallel to the bottom wall of the chassis near the arm portion.

9. The cage mounting assembly as claimed in claim 1, wherein the arm portion of the supporting base upwardly extends at least one extrusion member, said extrusion member forms said pillar.

10. The cage mounting assembly as claimed in claim 1, wherein a root of said pillar forms a blocking ring for fixing the spring on said pillar.

11. A computer case comprising: a chassis comprising a bottom wall, the bottom wall engaging with a supporting base, the base forming an arm portion and an engaging hook, the arm portion engaging at least one elastic member; and a cage mounted to the chassis, said cage comprises at least two receiving plates, one of said plates forming a restraining tab thereunder corresponding to the at least one elastic member of the base, the other of said plates forming an engaging barb; wherein the cage is moved into the chassis, said elastic member is compressed, then the engaging hook engages with the engaging barb, thereby mounting the cage to the chassis; when the cage is disengaged with the chassis, the cage is pushed out from the chassis by the compressed elastic member.

12. The computer case as claimed in the claim 11, wherein the base has a bottom portion, the bottom portion extends said arm portion and forms an operating member thereof.

13. The computer case as claimed in the claim 12, wherein the operating member comprises said engaging hook and a handle extending therefrom.

14. The computer case as claimed in the claim 12, wherein the bottom portion of the base defines a guiding slot parallel to the bottom wall of the chassis near the arm portion.

15. The computer case as claimed in the claim 11, wherein the chassis further comprises two side walls substantially perpendicularly extending from the bottom wall, one of the two side walls is mounted with a sliding rail.

16. The computer case as claimed in the claim 15, wherein the cage is supported between the sliding rail on the side wall and the base.

17. The computer case as claimed in the claim 11, wherein the cage forms said engaging barb thereof corresponding to the engaging hook of the base.

18. The computer case as claimed in the claim 11, wherein the arm portion of the base upwardly extends at least one extension member, the extension member forms a pillar engaging with said elastic member.

19. The computer case as claimed in the claim 18, wherein a root of said pillar forms a blocking ring for fixing the elastic member on the pillar.

20. The computer case as claimed in the claim 11, wherein the cage comprises a connecting plate and two erect plates, the connecting plate forms a brim received in the guiding slot in the supporting base.

21. The computer case as claimed in the claim 11, wherein the chassis further comprises a front wall.

22. The computer case as claimed in the claim 21, wherein the front wall defines an opening and a mounting aperture near the opening for the handle penetrating therethrough.

23. A cage mounting assembly comprising: a chassis comprising a front wall, the front wall defining an opening in a front-to-back direction, and another wall adjacent to the front wall; a supporting base mounted to the another wall of the chassis, the base comprising at least one elastic member formed along said front-to-back direction; and at least one pillar covered with a spring and a cage inserted into the chassis through the opening along said front-to-back direction; said cage comprises a plurality of receiving plates, one of said plates having a barb, and another of said plates forming at least one restraining tab corresponding to said pillar of the base, wherein when the cage is fixed to the chassis, the at least one elastic member of the base is compressed; when the cage is intended to be disengaged from the chassis, the cage is pushed out from the chassis by resumption force due to the compressed elastic member.

24. The cage mounting assembly as claimed in claim 23, wherein the supporting base includes a releasable latch to lock the inserted cage in position to compress the elastic member.

* * * * *